United States Patent Office 3,077,154
Patented Feb. 12, 1963

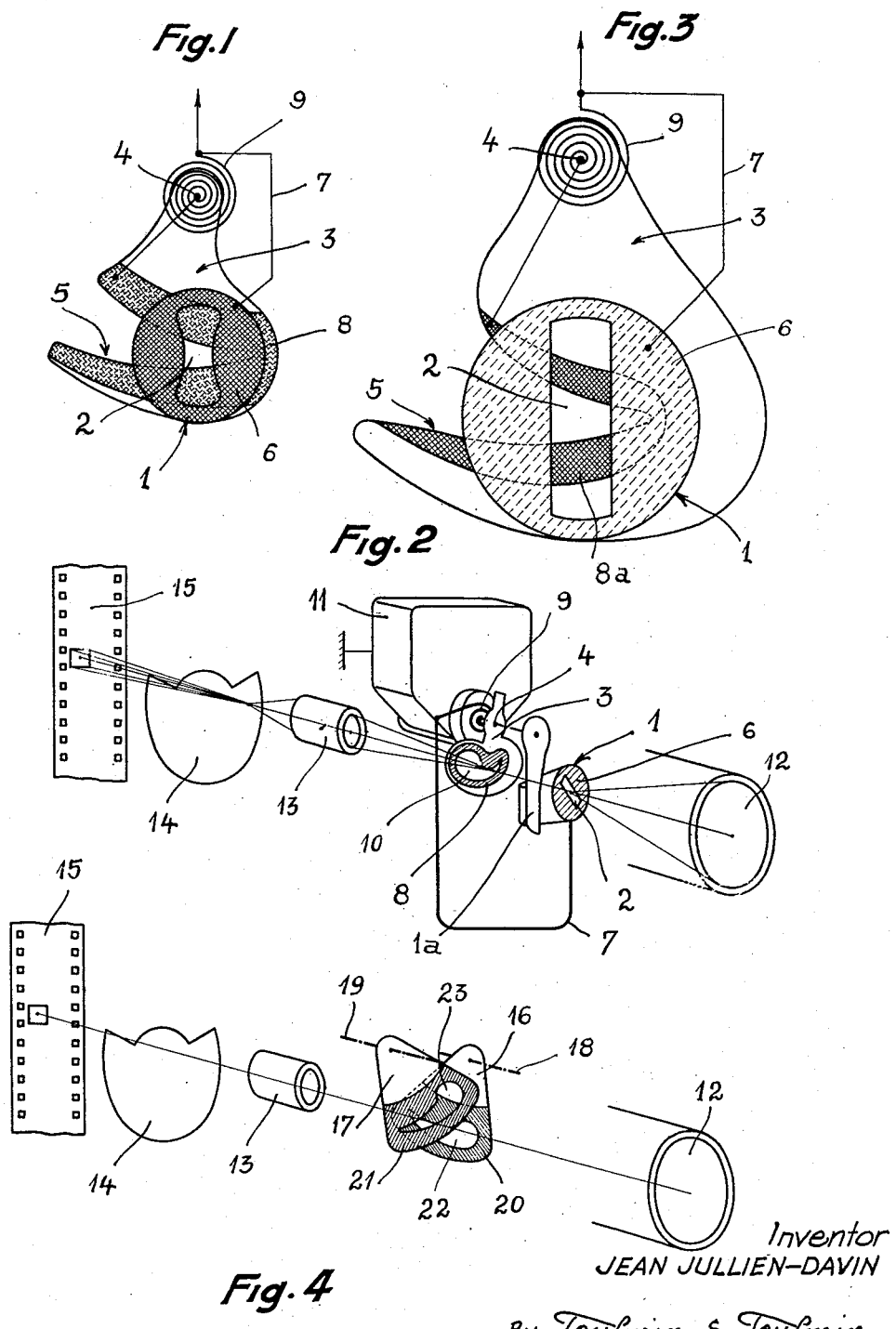

3,077,154
CAMERAS INCLUDING A DIAPHRAGM AND A PHOTOELECTRIC CELL
Jean Jullien-Davin, Valence, France, assignor to Compagnie Crouzet, Valence, France, a French company
Filed Oct. 24, 1960, Ser. No. 64,425
Claims priority, application France Nov. 6, 1959
15 Claims. (Cl. 95—64)

The present invention relates to cameras (photographic, cinematographic apparatus or the like) whose diaphragm is connected to a lightsensitive element or photoelectric cell of suitable type (having a front or rear barrier layer, of silicon, selenium, germanium or photoresistant) or is controlled by such a cell.

In known apparatus, the cell or lightsensitive element (whether this be merely connected to the diaphragm or controls it directly or indirectly, for example through the medium of a galvanometer or a small transistor amplifier supplying power to a motor) is usually located outside the path of the light rays striking the lens assembly of the camera. In most cases, this lightsensitive element is located in a housing adjacent the lens assembly and includes its own lens which has the same axis as that of the camera lens assembly. In other cases, the lightsensitive element is disposed around the lens assembly, forming a ring around the latter. It has also been proposed to place the lightsensitive element on the front face of the shutter.

None of these arrangements gives full satisfaction; when the lightsensitive element is disposed outside the path of the light rays striking the lens assembly of the camera, the ratio between the light entering the lens and that striking the lightsensitive element is ill-defined, owing to the directive effect of the optical system associated with said element; when the lightsensitive element surrounds the lens assembly, the aforementioned drawback remains; when it is desired to place the lightsensitive element on the shutter there arises the delicate and practically imperfectly solved problem of the electrical connections for very weak currents to achieve between fixed points and points located on a moving element (shutter) undergoing high speed movements and subjected to high angular accelerations.

The present invention avoids the aforementioned drawbacks and affords, furthermore, certain advantages as will be understood hereinafter. The invention is characterised in that the lightsensitive element or surface (photoelectric cell) connected to (or controlling) a diaphragm is provided—at least partially—on at least a part of the front surface of the part or parts (blades) constituting the diaphragm proper so as to be struck by a part of only the light rays entering the lens assembly of the camera.

It can immediately be seen that one of the advantages of this arrangement is that the lightsensitive element is influenced directly and solely by a part of the light passing through the lens assembly. Thus it is possible to use lens assemblies having different focal lengths (normal lens, wide-angle lens, telescopic lens, variable focal length or zoom lens, etc.), anamorphotic lenses, etc.

The invention can be embodied in different ways characterised by the following features and combinations thereof: in the case where the diaphragm comprises a fixed blade having a central aperture (or a ring provided with apertures of different diameters) and possibly a moving blade moving behind said fixed blade, the lightsensitive element or surface is disposed on at least a part of the front face of the fixed blade, preferably around the central aperture of said blade; in the case where the diaphragm comprises a fixed blade and a moving blade movable relative to said fixed blade, the lightsensitive elements or surfaces are disposed on at least a part of the front face of the fixed blade and (or) on at least a part of the front face of the moving blade; in the case where the moving blade moves behind the fixed blade having a central aperture, the lightsensitive element or surface of said moving blade surrounds the aperture of said moving blade and its edges are defined in such manner that the whole of the lightsensitive surface varies in accordance with a given law which is a function of the opening of the diaphragm; in the case where the diaphragm comprises two (or more) moving blades moving one in front of the other (or one behind the other), the lightsensitive element or surface is provided on the front face of the front blade and possibly on the front face of the rear blade or blades; in the case of a diaphragm having a plurality of blades controlled by one or more galvanometers, the front blade (whether it be fixed or moving) comprises, in addition to its aperture provided for the passage of the light rays which are to mark the photographic surface, one or more auxiliary apertures located outside the zone of passage of said light rays, apertures through which a fraction of the light can pass and strike the lightsensitive element or surface carried by the front face of the blade situated immediately behind the front blade; in the case where the lightsensitive element or surface is provided on one (or more) moving blade of the diaphragm and where said (or each) moving blade is controlled by the galvanometer associated with said element, the (or each) electrical connection of the lightsensitive element or surface is ensured by the very coil or coils of said galvanometer; in a modification, the lightsensitive surface is disposed on the front face of a false or dummy diaphragm, that is the front face of a blade apertured to the maximum effective opening of the lens assembly and disposed immediately in front of the diaphragm proper, if desired, between the optical elements of the camera lens assembly; in all cases, the lightsensitive element or surface arranged in the above-indicated manner can be, in the known manner, associated with suitable correcting means (for example a rheostat in series with the coil of the galvanometer, etc.) for regulating the diaphragm in accordance with the sensitivity of the photographic film; in the case where there is a plurality of lightsensitive elements, the latter can be connected either in parallel or in series with the galvanometer controlling the blade or blades.

Further features and advantages of the invention will be apparent from the ensuing description of some embodiments of the invention which have been given merely by way of example and are shown diagrammatically in the accompanying drawing in which:

FIG. 1 is a front elevational view of a diaphragm of a camera incorporating an embodiment of the invention;

FIG. 2 is a perspective view showing the relative positions of the elements of the camera lens assembly, the diaphragm, the galvanometer controlling the latter, the lightsensitive element carried by the blades of the diaphragm, the shutter and the film;

FIG. 3 is a front elevational view of a modification of the diaphragm having lightsensitive elements, and FIG. 4 is a perspective view of another embodiment of a diaphragm having lightsensitive elements.

In the embodiment shown in FIG. 1, the diaphragm comprises a fixed blade 1 provided with a central aperture 2 and a moving blade 3 mounted for pivotal movement about an axis 4 and having a notch 5 which, in co-operation with the central aperture 2, defines the effective opening of the camera lens assembly whose elements (not shown in the drawing) will be supposed to be located respectively in front of and at the rear of the diaphragm.

According to the invention, the front face of the fixed blade 1 carries a lightsensitive element or surface 6 connected by a connection 7 to the galvanometer (not shown in the drawing) whose moving part directly controls the moving blade 3. The front face of the moving blade 3 carries a lightsensitive element or surface 8 connected to said galvanometer by the spiral 9 of said galvanometer.

In this embodiment, the lightsensitive surface exposed to the light rays striking the lens assembly increases with the luminosity, that is, as the diaphragm opening closes. In order to obtain a lightsensitive surface of invariable size, it suffices to provide it solely on the fixed blade 1.

FIG. 2 shows, on the one hand, the fixed diaphragm blade 1 which is carried by a lever 1a, has its central aperture 2 and is provided with its lightsensitive element or surface 6, and, on the other hand, the moving blade 3 with its lightsensitive element or surface 8. In this arrangement, however, the moving blade has an aperture 10 (instead of the notch 5 of the preceding embodiment), and the lightsensitive element or surface 8 is disposed around this aperture 10.

The lightsensitive elements or surfaces 6 and 8 are connected to the galvanometer 11 by the conductor 7 and the spiral 9 respectively.

Respectively disposed in front of and at the rear of the diaphragm 1—3 are the front optical element 12 and the rear optical element 13 of the camera lens assembly, behind which are disposed in succession the shutter 14 and the film 15. It must be understood that the invention is also applicable to the case where the elements of the camera lens assembly are entirely in front of or behind the blade of the diaphragm.

The embodiment shown in FIG. 3 (in which elements similar to those shown in FIG. 1 carry the same reference characters) differs from that shown in FIG. 1 solely in that the lightsensitive element or surface 8a of the moving blade 3 of the diaphragm has such contour that the entire area of the lightsensitive surface exposed to the light is constant or, on the contrary, varies in accordance with a law which is a function of the opening of the diaphragm.

In the embodiment shown in FIG. 4 (in which elements similar to those shown in FIG. 2 carry the same reference characters), the diaphragm is constituted by two moving blades 16 and 17 mounted for pivotal motion about axes 18 and 19 and carrying on their front face lightsensitive elements or surfaces 20 and 21 respectively surrounding the apertures 22 and 23 of said blades.

It must be understood that the embodiments of the invention described and shown in the accompanying drawings have been given merely by way of example and any modification can be made therein without departing from the scope of the invention which also embraces the new industrial product constituted by a camera of the photographic or cinematographic type incorporating any of the aforementioned improvements.

What I claim is:

1. In a camera having an objective lens assembly, diaphragming means for controlling the passage of the light rays passing through said objective lens assembly, driving means for controlling said diaphragming means and lightsensitive means connected to said driving means for controlling the latter, as a function of the light intensity, the location of at least a part of said lightsensitive means on at least a part of the front face of said diaphragming means, so that the lightsensitive means be struck only by a part of the light rays substantially directed onto the zone of said objective lens assembly and that the diaphragmatic means are controlled by an energy which is a function of the stopping down of the objective lens assembly.

2. A camera as in claim 1, wherein the diaphragming means comprises at least one fixed blade having at least one opening and where at least one part of the lightsensitive means is located on at least a part of the front face of said blade, around its opening.

3. A camera as in claim 1, wherein the diaphragming means comprises a fixed blade and a movable blade and where at least one part of the lightsensitive means is located on at least a part of the front face of the fixed blade.

4. A camera as in claim 1, wherein the diaphragming means comprises a fixed blade and a movable blade and where at least one part of the lightsensitive means is located on at least a part of the front face of the movable blade.

5. A camera as in claim 1, wherein the diaphragming means comprises a fixed blade and a movable blade and where at least one part of the lightsensitive means is located on at least a part of the front face of the fixed blade and on at least a part of the front face of the movable blade.

6. A camera as in claim 1, wherein the diaphragming means comprises a fixed blade having a central aperture and a movable blade having an opening which is movable behind the aperture of the fixed blade and where at least a part of the lightsensitive means is located on the front face of said movable blade, around the opening of said latter blade.

7. A camera as in claim 1, wherein the diaphragming means comprises at least two movable blades, one in front of the other, and where at least a part of the lightsensitive means is provided on the front face of the front blade.

8. A camera as in claim 1, wherein the diaphragming means comprises at least two movable blades, one in front of the other, and where at least a part of the lightsensitive means is provided on the front face of the front blade and the front face of the rear blade.

9. A camera as in claim 1, wherein the diaphragming means comprises at least two movable blades, one in front of the other, and where at least a part of the lightsensitive means is provided on the front face of the rear blade.

10. A camera as in claim 1, wherein the diaphragming means comprises several blades, the blade situated immediately behind the front blade carrying at least one part of the lightsensitive means, whereas the said front blade comprises, on the one hand, an aperture for the passage of the light rays for marking the sensitive surface of a sensitive material to be used in the camera and, on the other hand, located outside of said aperture, at least one opening for the passage of light rays which can impinge the said lightsensitive means.

11. A camera as in claim 1, wherein the diaphragming means comprises at least a movable blade carrying at least a part of said lightsensitive means and where the driving means is formed by at least one galvanometer having a spiral, said spiral ensuring the connection which connects the said lightsensitive means to said driving means.

12. A camera as in claim 1, wherein the diaphragming means comprises a fixed front blade having an aperture corresponding to the maximum effective diaphragming opening of the objective lens assembly and where at least a part of the lightsensitive means is carried by the front face of said blade.

13. A camera as in claim 1, further comprising correcting means combined with the lightsensitive means, allowing the regulating of said diaphragming means in accordance with sensitivity degree of the surface of a sensitive material designed to be used in the camera.

14. A camera as in claim 1, wherein the lightsensitive means are subdivided into at least two parts in parallel connection with the driving means.

15. A camera as in claim 1, wherein the lightsensitive means are subdivided into at least two parts in series connection with the driving means.

References Cited in the file of this patent

UNITED STATES PATENTS 2,058,532   Tuttle ------------------ Oct. 27, 1936
2,841,064   Bagby et al. ------------ July 1, 1958